United States Patent [19]

Kalen

[11] Patent Number: 4,844,311
[45] Date of Patent: Jul. 4, 1989

[54] OBJECT HOLDER

[76] Inventor: Daniel A. Kalen, 8344 A Farley, Overland Park, Kans. 66212

[21] Appl. No.: 158,701

[22] Filed: Feb. 22, 1988

[51] Int. Cl.$^4$ .............................................. B60R 7/00
[52] U.S. Cl. .................................. 224/312; 224/273; 224/42.46 R; 206/387
[58] Field of Search ............ 224/312, 311, 273, 42.46; 206/387; 297/97 B, 97 H

[56] References Cited

U.S. PATENT DOCUMENTS

| | | | |
|---|---|---|---|
| 1,701,696 | 2/1929 | Parsons | 296/97 B |
| 1,925,123 | 9/1933 | Vincent | 206/97 G |
| 2,486,096 | 10/1949 | Axford et al. | 224/312 X |
| 2,673,670 | 3/1954 | Steel | 224/312 X |
| 2,707,072 | 4/1955 | Sims | 224/312 X |
| 2,908,434 | 10/1959 | Schnabel | 224/312 X |
| 2,931,114 | 4/1960 | Peterson | 224/312 X |
| 3,026,999 | 3/1962 | Constantino | 224/312 X |
| 4,287,989 | 9/1981 | Plummer | |
| 4,502,596 | 3/1985 | Saetre et al. | |
| 4,512,468 | 4/1985 | Stravitz | |
| 4,570,991 | 2/1986 | Lystad | 296/97 H X |

FOREIGN PATENT DOCUMENTS 1212525  3/1960 France .................................. 224/312

Primary Examiner—Frankie L. Stinson
Attorney, Agent, or Firm—Hovey, Williams Timmons & Collins

[57] ABSTRACT

An economical holder for solid objects such as audio cassettes, cartridges, compact disks, or the like is provided which is designed to couple with the sun visor or a vehicle in order to store solid objects for convenient access by the vehicle occupant. The preferred holder comprises a sheet of flexible material having closable pairs of holder pockets arranged thereon and coupling strips attached to opposed edges of the sheet. In use, the sheet is placed about the sun visor with coupling strips coupling the edges of the sheet to hold snugly to the visor so that corresponding pockets are presented respectively above and below the visor for access by the vehicle occupant.

18 Claims, 1 Drawing Sheet

OBJECT HOLDER

BACKGROUND OF THE INVENTION

1. Field of the Invention

The present invention concerns a holder having pockets for solid objects such as audio cassettes and cartridges, compact disks, or the like which is designed to couple with the sun visor of a vehicle in order to present the pockets for convenient access by the vehicle occupant. More particularly, the present invention is concerned with a holder made of flexible material which can be coupled to the visor of a vehicle and thereby conform to the shape thereof to produce a snug fit.

2. Background of the Prior Art

Automotive sound systems having the capability of playing prerecorded music as available on tape cassettes, cartridges, compact disks, or the like have become very popular. Most vehicles, however, do not provide a place to store cassettes or the like to protect them from direct sunlight and to provide convenient access by the vehicle occupant, typically the driver.

U.S. Pat. No. 4,287,989 discloses a device intended to provide storage for tape cassettes in a vehicle. The storage container as described in the U.S. Pat. No. 4,287,989 patent discloses a solid, hinged body which is designed to connect to the sun visor of a vehicle. The device includes protuberance members which are capable of partially fitting within the capstan locating holes of a tape cassette to hold the cassette within a sleeve defined by solid walls incorporated as part of the container. The device presents a problem in that its solid construction prevents use with some sun visors because it cannot flexibly conform to a variety of shapes and sizes. Additionally, the solid construction and mechanical complexity of the device prevent economical manufacture.

SUMMARY OF THE INVENTION

The object holder in accordance with the present invention solves the problems of the prior art as outlined above. Specifically, the invention hereof allows the economical manufacture of a holder which is designed to flexibly conform to the shape of sun visors of various sizes and shapes and thereby snugly couple thereto.

The preferred object holder includes a flexible sheet of material, means for snugly coupling the sheet with the visor of a vehicle for flexible conformation to the shape thereof, and flexible material coupled with the outer surface of the sheet for forming at least one object-receiving pocket.

Preferably, the holder is designed to adjustably couple with a sun visor by means of hook-and-eye fasteners and presents a plurality of object-receiving pockets arranged respectively above and below the visor. Additionally, the preferred holder includes hook-and-eye fasteners for closing the pocket openings. The preferred holder also includes means such as hook-and-eye fasteners for releasably holding the visor in its upward position so that weight of the objects stored in the holder do not cause the visor to shift downwardly.

BRIEF DESCRIPTION OF THE DRAWING FIGURES

DESCRIPTION OF THE PREFERRED EMBODIMENT

Figures 2, 3:
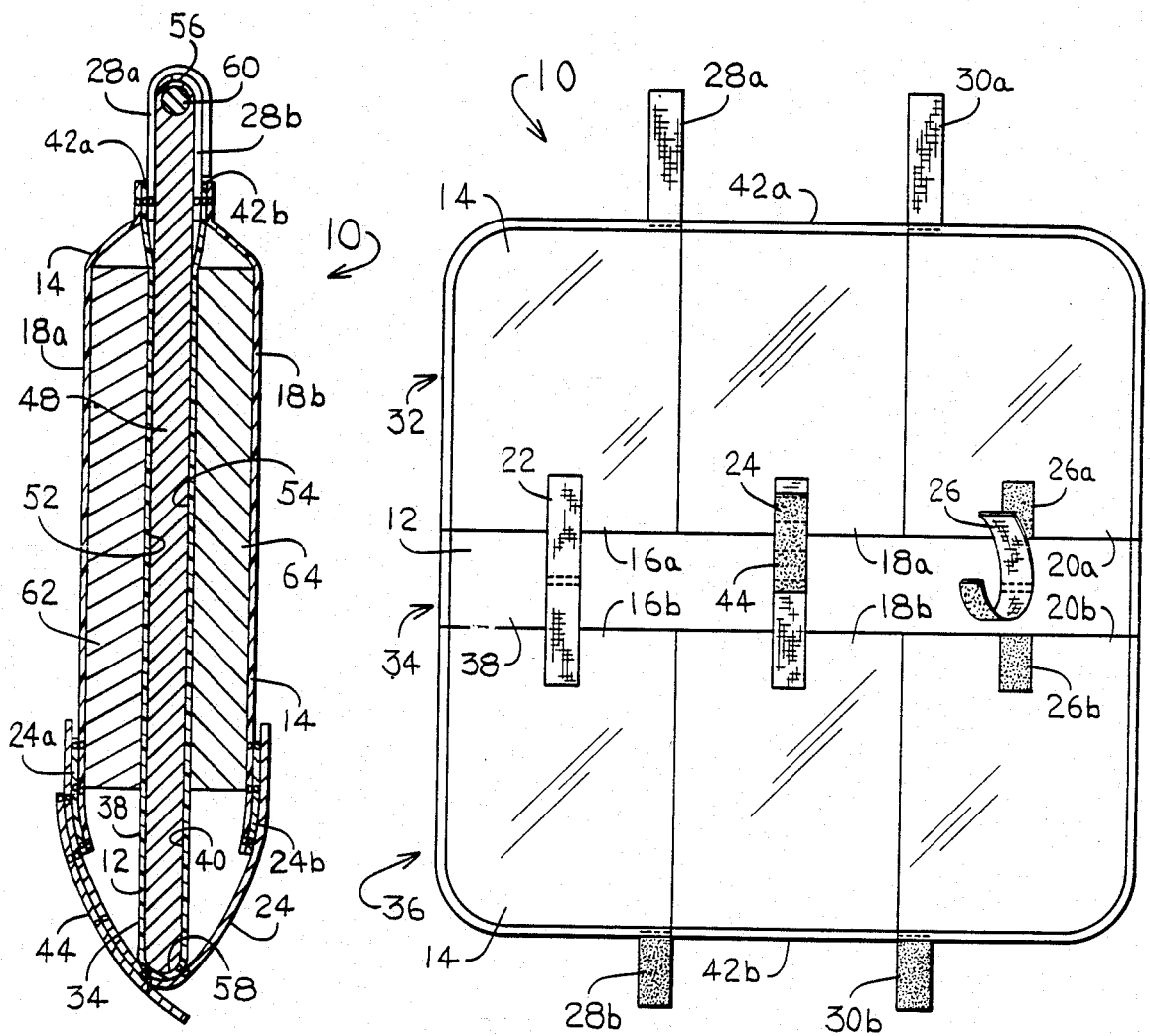
FIG. 2 is a sectional view of the sun visor and object holder taken along line 2—2 of FIG. 1.
FIG. 3 is a plan view of the object holder when not coupled with a sun visor.

FIG. 3 illustrates preferred object holder 10 in plan view before coupling with the sun visor of a vehicle. Object holder 10 includes rectangular flat flexible sheet 12, pocket material 14 forming pockets 16a,b, 18a,b, and 20a,b, pocket closing strips 22, 24, and 26, and visor coupling strips 28a,b, and 30a,b.

Sheet 12 is preferably composed of flexible vinyl although any equivalent flexible material of fabric can be used. Sheet 12 presents first zone or portion 32, intermediate zone or portion 34, and second zone or portion 36. Additionally, sheet 12 presents outer surface 38, inner surface 40 (FIG. 2), and opposed coupling edges 42a and b.

Pocket material 14 is also preferably composed of flexible vinyl although as with sheet 12, any flexible material or fabric can be used equivalently. Pocket material 14 is coupled to top surface 38 of sheet 12 by heat sealing, sewing or the like, and is configured to present pockets arranged in opposed pairs 16a,b, 18a,b, and 20a,b. The pockets of each pair are arranged on opposite sides of intermediate zone 34 so that one pocket of each pair lies in first zone 32 and the other lies in second zone 36. Additionally, the pockets of the given pair open toward intermediate zone 34 and thereby toward one another.

Pocket closing strips 22-26 are preferably composed of hook-and-eye fasteners such as VELCRO. The outer surface of each pocket 16-20 includes a corresponding closing piece of hook-and-eye fastener to mate with the corresponding closing strip 22-26. Closing pieces 24a,b (FIG. 2), and 26,b (FIG. 3) correspond to respective closing strips 24 and 26 in order to close pockets 18a,b and 20a,b. Similar closing pieces are included on pockets 16a,b to correspondingly mate with closing strip 22 order to releasably close this pocket as well.

Closing strip 24 includes an additional hook-and-eye holding strip 44 which faces outwardly in order to releasably couple with a corresponding holding piece 46 (FIG. 1) which can be attached to the interior of the vehicle ceiling as will be described further hereinbelow.

Visor coupling strips 28a,b, and 30a,b are attached to coupling edges 42a,b of sheet 12 as shown in FIG. 3. Coupling strip 28a extends outwardly from coupling edge 42a and is designed to matingly and releasably couple with coupling strip 28b which is connected to coupling edge 42b. Similarly, coupling strip 30a extends outwardly from coupling edge 42a is designed to couple with strip 30b extending outwardly from coupling edge 42b. Visor coupling strips 28a,b and 30a,b are composed of mated hook-and-eye fasteners such as VELCRO.

Figure 1:
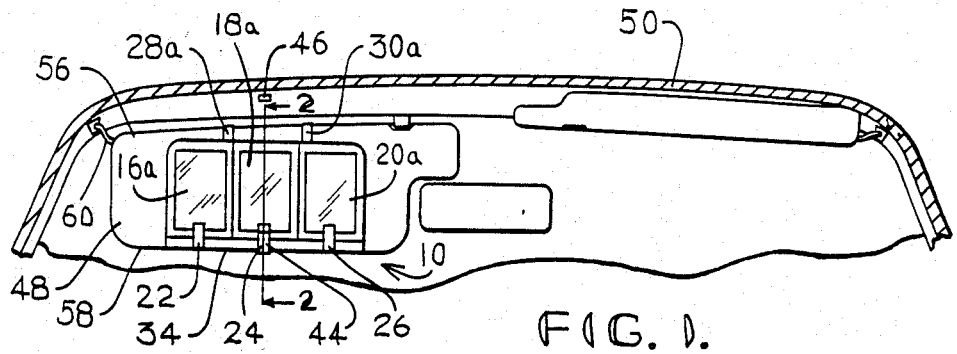
FIG. 1 is a forwardly looking, partial sectional view of the interior of a vehicle showing the object holder coupled with the driver's side sun visor.

Object holder 10 is designed to couple with a conventional vehicle sun visor 48 as shown in FIGS. 1 and 2 included as part of motor vehicle 50. Visor 48 presents upper face 52, lower face 54, outer edge 56 disposed toward the front of the vehicle and inner edge 58 disposed toward the interior of the vehicle. Additionally, pivot shaft 60 pivotally couples visor 48 with vehicle 50 about a horizontal axis adjacent and generally parallel to outer edge 56.

In use, object holder 10 is placed about sun visor 48 with inner surface 40 adjacent the surface of visor 48, with coupling edges 42a,b adjacent visor inner edge 58, and with intermediate zone 34 adjacent visor outer edge 56 (FIG. 2). Coupling edges 48a and b are then pulled toward visor outer edge 46 of visor 48 and coupling strips 28a,b and strips 30a,b joined about under outer edge 56 to hold sheet 12 and thus object holder 10 snugly to visor 48. FIG. 2 illustrates pocket 18a holding an audio tape cassette 62 and pocket 18b holding audio tape cassette 64.

Object holder 10, when coupled with visor 48 as described above, places first zone 32 adjacent visor upper face 52 and second zone 36 adjacent visor lower face 54 with intermediate zone 34 extending around visor inner edge 58. With this arrangement, pockets 16a, 18a, and 20a are presented above visor upper face 52 and pockets 16b, 18b, and 20b are presented below visor lower face 54. Additionally, with this arrangement the openings of all the pockets 16-20 open toward visor inner edge 58 and thereby toward the vehicle interior. In this way, all the pockets are readily accessible to the driver or other vehicle occupant.

If the driver, for example, wishes access to pocket 18a, the driver detaches closing strip 24 from closing piece 24a of pocket 18a thereby exposing the opening of pocket 18a for insertion or removal of a cassette or the like. Note that pocket closing strip 24 remains coupled with corresponding closing piece 24b of pocket 18b. Similarly, access to pockets 16a,b and 20a,b are obtained by detaching strips 22 and 26 respectively from the pocket of interest.

The flexible nature of sheet 12 and pocket material 14 allows object holder 10 to conform to the shape of visor 48. Many sun visors are padded and thereby present a slight "hump" which prevents practical use of a holder constructed of solid materials unless that holder is specifically designed for that particular shape and size of visor. The flexible nature of object holder 10, however, allows it to flexibly conform to any shape of visor. Additionally, the length of coupling strips 20a,b and 30a,b allow holder 10 to be snugly coupled with the visor of virtually any width commonly in use.

When object holder 10 is in use, the weight of objects in pockets 16-20 may cause visor 48 to shift downwardly from its normally upward position to its downward position as shown in FIG. 1. Such an occurance may be undesirable and accordingly, the preferred holder includes holding piece 46 for adhesive attachment to the interior surface of the vehicle ceiling as shown in FIG. 1 whereby holding strip 44 can releasably couple with holding piece 46 in order to hold visor 48 in its upward position. When desired, the user pulls down on visor 48 which releases the hold between strip 44 and piece 46 thereby allowing convenient access to pockets 16a, 18a, and 20a.

Those skilled in the art will appreciate that the present invention encompasses many variations in the preferred embodiment as described herein. For example, although hook-and-eye fasteners strips are preferred for use in coupling object holder 10 to visor 48 and for closing pockets 16-20, buttons, belt buckles, zippers, or the like could be used in the alternative for the same purposes. Additionally, each individual pocket could have its own closing strip for closing the pocket opening rather than use of a single strip for closing corresponding pairs of pockets as preferred herein. Also, holder 10 could be arranged with coupling edges 42 disposed toward inner edge 58 as a matter of design choice. As a final example, sheet 12 could be arranged as a tubular member which could be slipped over visor 48 thereby coupling it thereto.

Having thus described the preferred embodiment of the present invention, the following is claimed as new and desired to be secured by Letters Patent:

I claim:

1. A holder for coupling with a sun visor of a vehicle for holding solid objects such as tape cassettes, cartridges, compact disks, or the like, the visor presenting an upper face and a lower face, said holder comprising:
    a flexible sheet of material presenting respective outer and inner opposed surfaces;
    means for snugly coupling said sheet with the visor with said inner surface adjacent thereto for flexible conformation to the shape thereof;
    flexible material coupled with said outer surface for forming at least one object-receiving pocket; and
    the visor being pivotal about a horizontal axis between upward and downward positions, said holder including means for selectively holding the visor in the upward position against the tendency of the visor to pivot toward the downward position under the weight of objects received in said pockets.

2. The holder as set forth in claim 1, said sheet presenting a first portion and a second portion, said coupling means coupling said first portion adjacent the visor upper face and the second portion adjacent the visor lower face, said flexible material forming at least one object-receiving pocket above the visor upper face and at least one object-receiving pocket below the visor lower face.

3. The holder as set forth in claim 2, said material forming three object-receiving pockets above the visor upper face and three object-receiving pockets below the visor lower face.

4. The holder as set forth in claim 3, the visor presenting an inner edge and an opposed outer edge, said pockets opening toward said inner edge for insertion and removal of solid objects into and from said pockets by a vehicle occupant.

5. The holder as set forth in claim 1, said selectively holding means including corresponding pieces of hook-and-eye fasteners respectively coupled with said holder and with the interior surface of the ceiling of a vehicle.

6. The holder as set forth in claim 1, said flexible sheet and said flexible material being composed of vinyl.

7. The holder as set forth in claim 1, said sheet presenting opposed edges, said coupling means including means for intercoupling said edges in order to snugly couple said sheet with the visor.

8. The holder as set forth in claim 7, said intercoupling means including corresponding strips of hook-and-eye fasteners respectively coupled with said coupling edges.

9. The holder as set forth in claim 8, said selectively closing means including corresponding strips of hook-and-eye fasteners.

10. The holder as set forth in claim 1, said pocket presenting an opening for insertion and removal of an object therefrom, said holder further including means for selectively closing said opening.

11. A holder adaptable for coupling with the sun visor of a vehicle for holding solid objects such as audio tape cassettes, cartridges, compact disks, or the like, the visor presenting respectively opposed, upper and lower faces, and inner and outer edges, the visor being pivotal about a generally axis generally parallel to and adjacent the outer edge between upward and downward positions, said holder comprising:
- a sheet of flexible material presenting respectively opposed outer and inner surfaces and first and second opposed coupling edges, said outer surface further presenting first and second zones;
- a plurality of walls of flexible material coupled with said upper surface for forming a plurality of object-holding pockets, each of said pockets presenting an object removal-and-insertion opening, said pockets being arranged with at least one pocket located in each of said zones;
- means for intercoupling said coupling edges for snugly coupling said holder about the visor with said inner surface in contact therewith so that said sheet generally conforms to the shape of the visor and for locating said first and second zones and said respective pockets respectively adjacent the upper and lower faces of the visor; and further including means for releasably preventing shifting of the visor from the upward position toward the downward position.

12. The holder as set forth in claim 11, said pockets being configured such that when said holder is coupled with the visor, said pocket openings are presented as opening toward the inner edge of the visor.

13. The holder as set forth in claim 11, said sheet further presenting an intermediate zone located between said first and second zones, said pocket openings being configured for opening toward said intermediate zone.

14. The holder as set forth in claim 13, said intercoupling means including structure for intercoupling said edges adjacent the visor inner edge, said intermediate zone being located adjacent the visor outer edge when said holder is coupled therewith.

15. The holder as set forth in claim 13, said holder further including means releasably closing said openings.

16. The holder as set forth in claim 15, said releasably closing means including hook-and-eye fasteners.

17. The holder as set forth in claim 16, said pockets being arranged so that each pocket of one of said zones has a corresponding pocket in the other of said zones, said closing means including a fastener strip for closing the openings of a corresponding pair of pockets.

18. The holder as set forth in claim 17, said closing means further including hook-and-eye fasteners.

* * * * *